US012676941B1

(12) United States Patent
Jin et al.

(10) Patent No.: US 12,676,941 B1
(45) Date of Patent: Jul. 7, 2026

(54) GRAPHICAL USER INTERFACE FOR DISPLAYING KEY PARTICIPANTS IN A CONFERENCE

(71) Applicant: Zoom Communications, Inc., San Jose, CA (US)

(72) Inventors: Miao Jin, Hangzhou (CN); Chunhan Li, Hangzhou (CN); Gang Ren, Hangzhou (CN); Pan Zhang, Hangzhou (CN); Yamin Zhou, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 255 days.

(21) Appl. No.: 18/495,990

(22) Filed: Oct. 27, 2023

(51) Int. Cl.
| | |
|---|---|
| *H04N 7/15* | (2006.01) |
| *H04L 65/403* | (2022.01) |
| *H04N 5/262* | (2006.01) |
| *H04N 5/278* | (2006.01) |
| *H04N 7/14* | (2006.01) |

(52) U.S. Cl.
CPC ......... *H04N 5/2628* (2013.01); *H04L 65/403* (2013.01); *H04N 5/278* (2013.01); *H04N 7/147* (2013.01); *H04N 7/148* (2013.01); *H04N 7/15* (2013.01); *H04N 7/157* (2013.01)

(58) Field of Classification Search
None
See application file for complete search history.

(56) References Cited

U.S. PATENT DOCUMENTS

| | | | |
|---|---|---|---|
| 7,679,638 B2 | 3/2010 | Eshkoli et al. | |
| 8,358,599 B2 * | 1/2013 | Shaffer | H04L 12/1822 |
| | | | 370/401 |
| 9,060,095 B2 * | 6/2015 | Petterson | G06V 40/161 |
| 11,082,661 B1 * | 8/2021 | Pollefeys | H04N 7/15 |
| 11,683,356 B2 | 6/2023 | Roedel et al. | |
| 2010/0189243 A1 * | 7/2010 | Miller | H04M 3/56 |
| | | | 379/202.01 |
| 2011/0044212 A1 * | 2/2011 | Tani | H04M 7/0042 |
| | | | 370/260 |
| 2015/0244981 A1 * | 8/2015 | Johnson | H04N 21/42203 |
| | | | 348/14.07 |
| 2016/0173821 A1 * | 6/2016 | De Magalhaes | H04N 23/61 |
| | | | 348/14.08 |
| 2018/0176508 A1 * | 6/2018 | Pell | H04L 65/1089 |
| 2020/0371677 A1 * | 11/2020 | Faulkner | G06F 3/14 |
| 2024/0333864 A1 * | 10/2024 | Peterson | H04N 5/2624 |

* cited by examiner

*Primary Examiner* — Quoc D Tran
(74) *Attorney, Agent, or Firm* — Young Basile Hanlon & MacFarlane, P.C.

(57) ABSTRACT

A conferencing system identifies key participants in a video conference and generates a graphical user interface (GUI) with enlarged participant tiles for displaying video streams of the identified key participants. The conferencing system outputs the GUI to client devices connected to the video conference. The conferencing system sends a notification to the client devices when a key participant joins the video conference or speaks during the video conference.

20 Claims, 11 Drawing Sheets

800

802

OUTPUT GUI TO CLIENT DEVICES

804

IDENTIFY KEY PARTICIPANT BASED ON PARTICIPANT IDENTIFIER

806

UPDATE GUI TO INCLUDE VIDEO FEED OF KEY PARTICIPANT IN KEY PARTICIPANT PORTION IN KEY PARTICIPANT TILE

808

OUTPUT UPDATED GUI TO CLIENT DEVICES

GRAPHICAL USER INTERFACE FOR DISPLAYING KEY PARTICIPANTS IN A CONFERENCE

FIELD

This disclosure generally relates to conferencing, and, more specifically, to graphical user interfaces for displaying participants in a conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
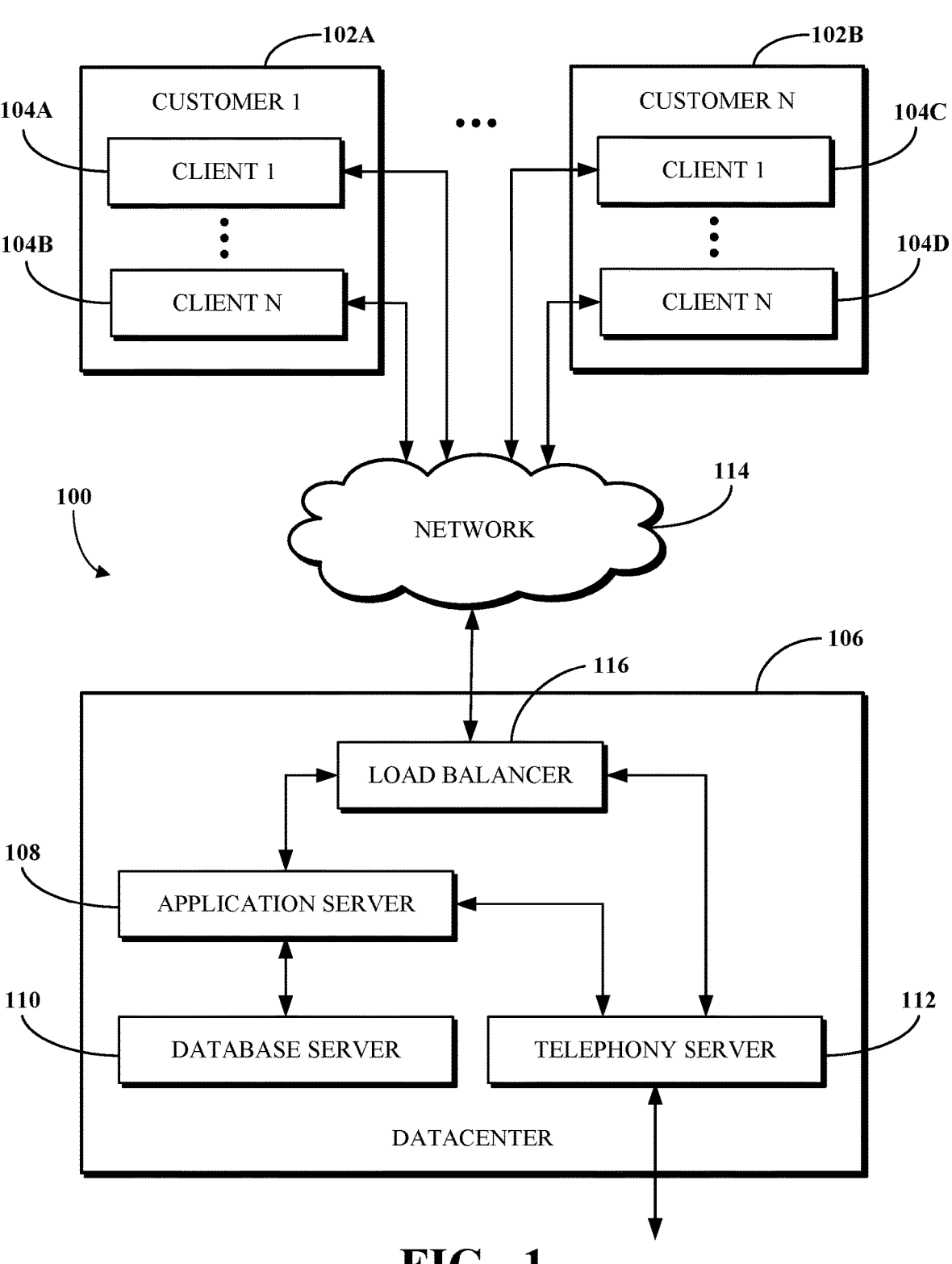
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conventional conferencing software user interfaces display participant tiles in a uniform manner, regardless of a participant's position within an organization or role in a conference. When a video conference has an excessive number of participants and the screen displays a large amount of information, conventional conference system user interfaces make it difficult for participants to identify key participants in a crowded field of participants. A key participant may be a participant that has achieved an elevated status within an organization or a participant that has an elevated role in a video conference (e.g., a host or organizer). In addition, transcripts from these large and often prolonged video conferences are typically lengthy and include text from many different speakers making it difficult for participants to identify utterances spoken by key participants of the video conference. In some scenarios, prolonged video conferences can lead to participant fatigue, thereby increasing the likelihood that participants will miss key utterances spoken by key participants during the video conference.

Implementations of this disclosure address problems such as these by conferencing software generating GUIs that identify key participants by way of enlarged participant tiles that are prominently displayed within the GUIs. For example, key participants can be identified by their elevated status within an organization or elevated role in a video conference and have their participant tiles automatically enlarged during the video conference to enable other participants to easily see their visual media (e.g., participant video streams). The conferencing software may also automatically highlight the text of a key participant in the transcript of the video conference. If there are multiple key participants in the video conference, the text of each key participant in the transcript may be highlighted in a different color. An audible, haptic, or other alert may be sent to participants' devices when a key participant joins the video conference or speaks during the video conference.

To describe some implementations in greater detail, reference is first made to examples of hardware and software structures used to implement a system for generating and outputting a GUI for displaying key participants in a conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
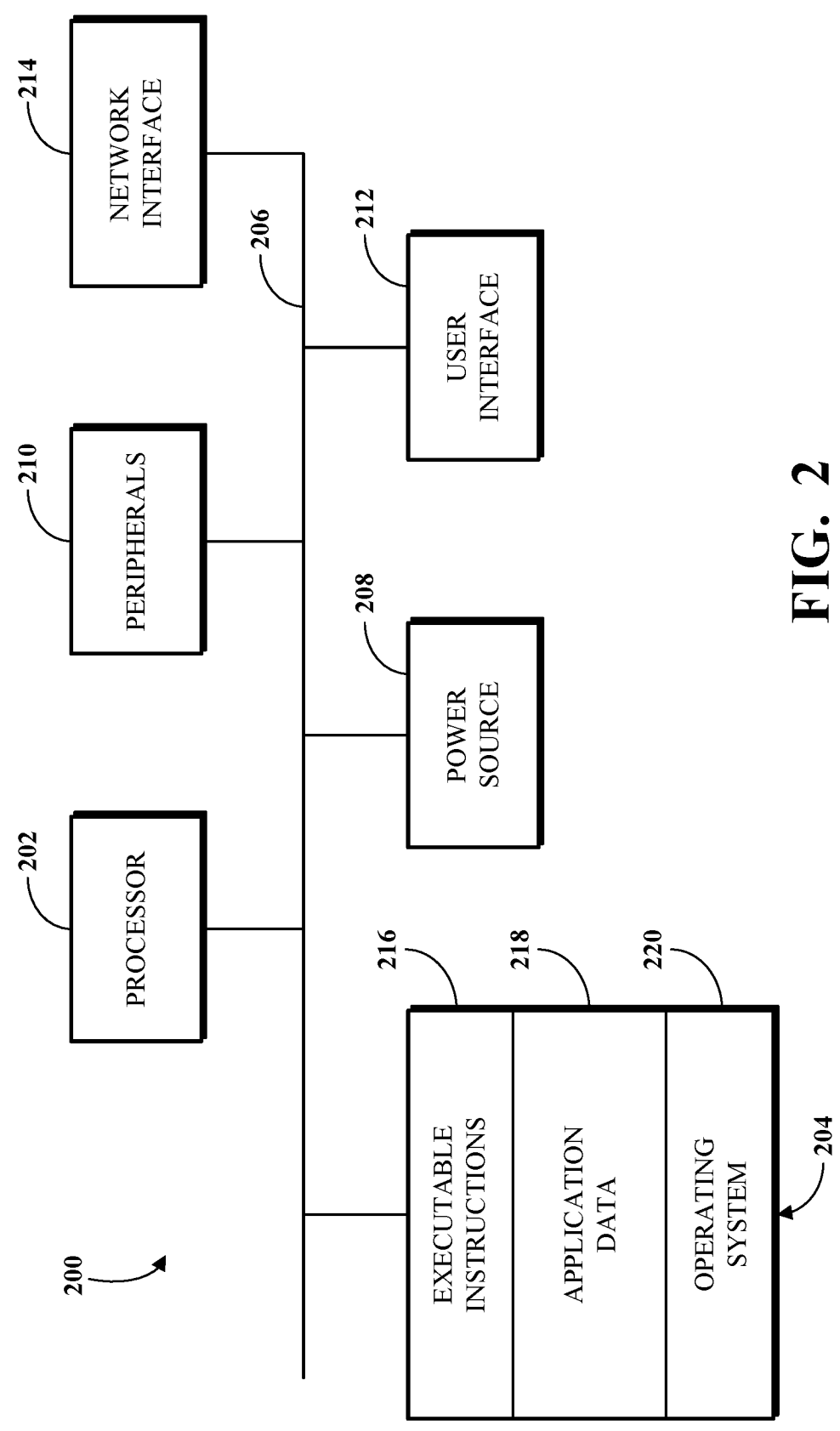
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
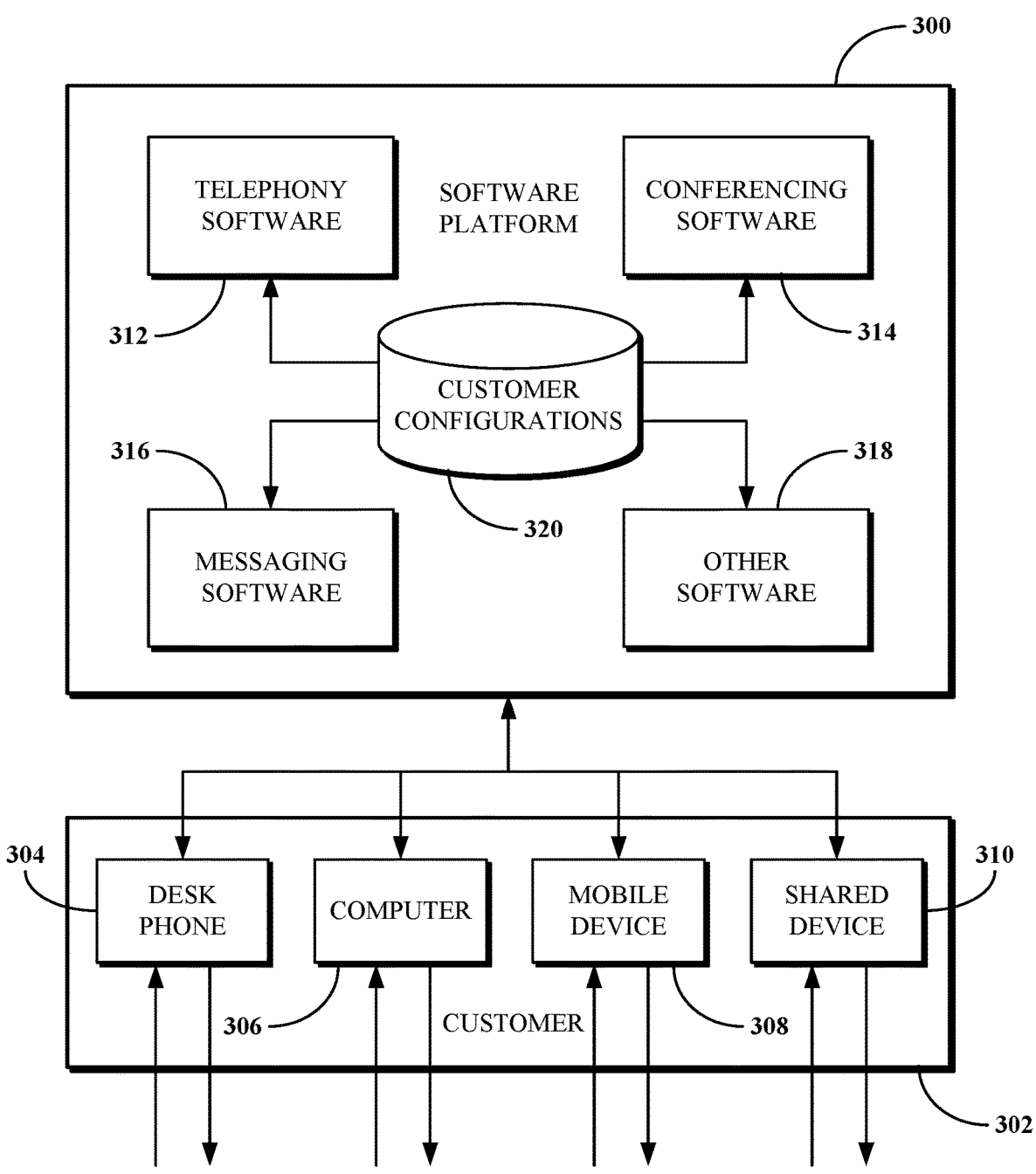
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for generating and outputting a GUI for displaying key participants in a video conference. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
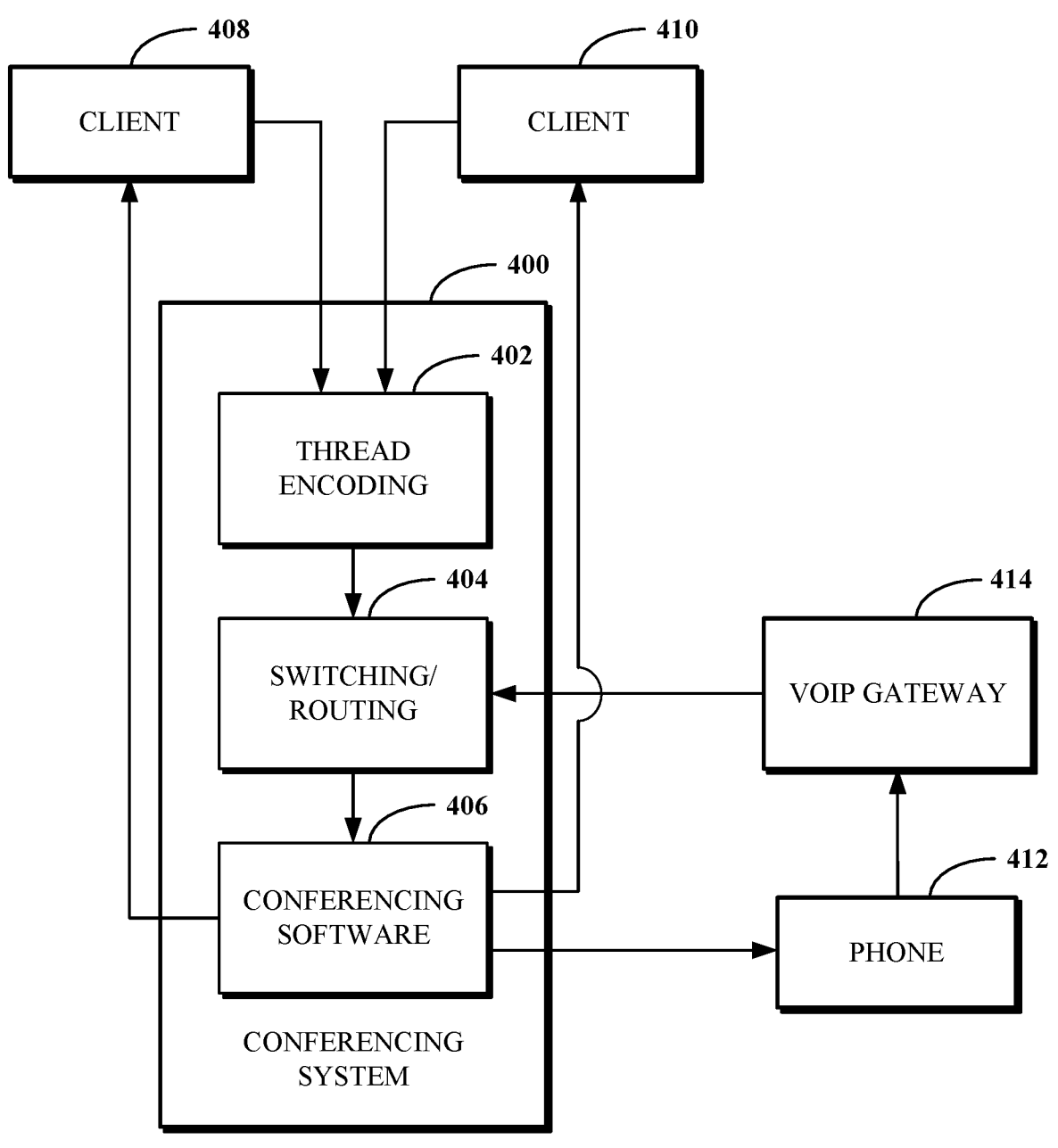
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
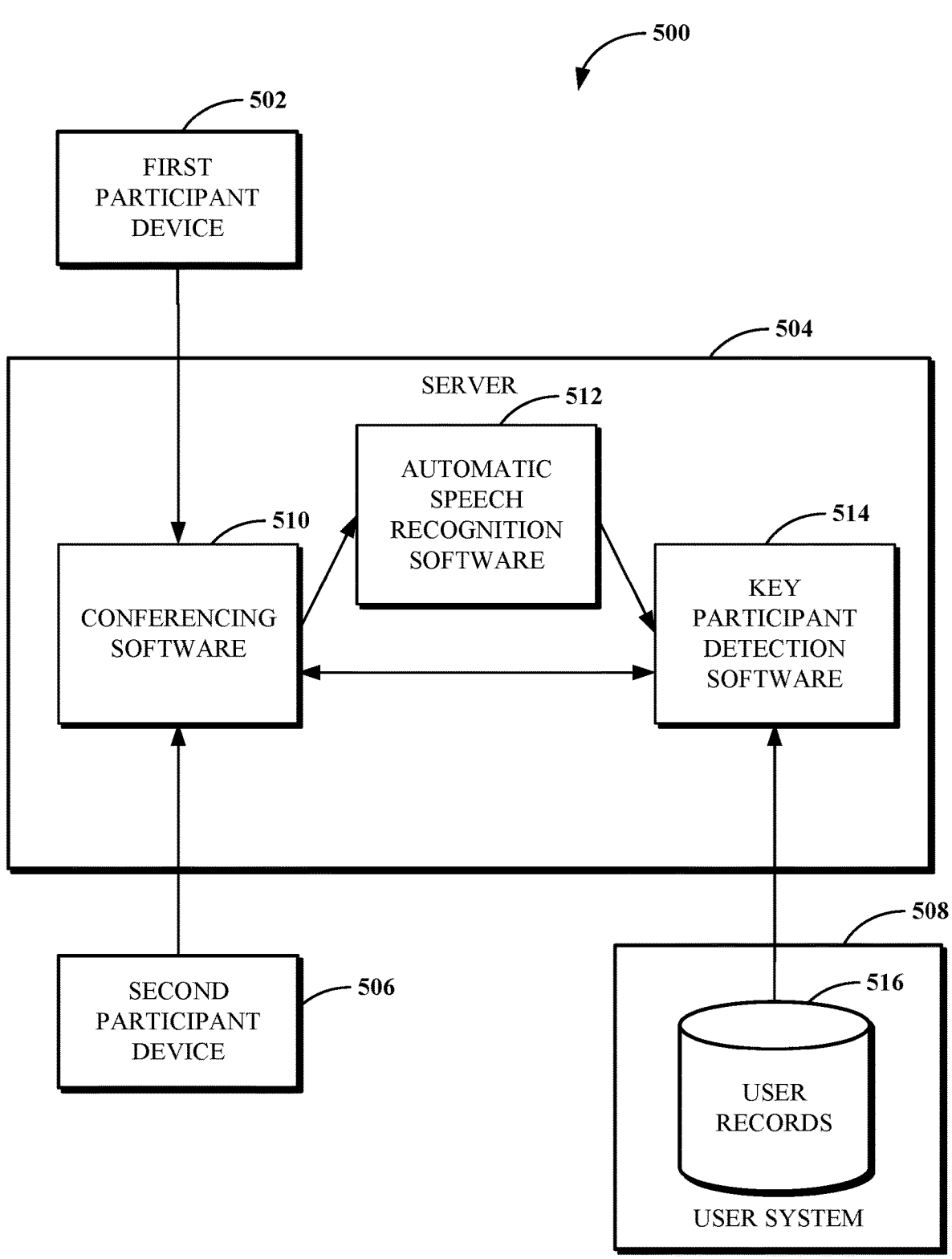
FIG. 5 is a block diagram of an example of a conferencing system for displaying key participants.

FIG. 5 is a block diagram of an example of a conferencing system 500 for displaying key participants. The conferencing system 500 includes a first participant device 502, a server 504, a second participant device 506, and a user system 508. The first participant device 502 and the second participant device 506 may, for example, each be one of the clients 304 to 310 shown in FIG. 3; however, the first participant device 502 and the second participant device 506 do not need to be client devices. The server 504 may be used to implement at least a portion of the software platform 300 shown in FIG. 3. For example, the server 504 may be used to implement some or all conferencing functionality of the conferencing software 314. In an example, the key participant detection functionality may be implemented in the other software 318 shown in FIG. 3. The user system 508 may include a database server, such as the database server 110 shown in FIG. 1. In some examples, the user system 508 may be implemented as a component of the server 504.

The server 504 includes conferencing software 510, automatic speech recognition (ASR) software 512, and key participant detection software 514. The conferencing software 510 may, for example, be the conferencing software 314 shown in FIG. 3. The conferencing software 510 is configured to enable audio, video, and/or other forms of conferences between multiple participants, such as a user of the first participant device 502 and a user of the second participant device 506. In this example, there may be additional participants in the video conference that are not shown in FIG. 5 for simplicity and clarity. The ASR software 512 is a transcription engine that is configured to monitor an audio component of the video conference, such as, for example, an audio channel used by the participant devices of the video conference, including those participant devices not shown in FIG. 5, via the conferencing software 510. The audio signals from each participant device may include metadata that can be used to identify the participant. The metadata may include a participant account, a participant identification (ID), a caller ID associated with the participant device, or any other data that can be used to identify the participant.

The ASR software 512 is configured to monitor the audio signals from the conferencing software 510. The ASR software 512 may detect speech in the audio signals and convert the detected speech to text to generate a real-time transcription of the video conference. The ASR software 512 may perform speech detection, voice recognition, audio channel processing, another form of audio processing, or a combination thereof. Users may opt-in to enable speech detection functionality, voice recognition functionality, audio channel processing functionality, or other forms of audio processing functionality. In some cases, the ASR software 512 may use a preset buffer delay. The ASR software 512 is configured to transmit the generated real-time transcription to the key participant detection software 514. In some implementations, the ASR software 512 may be implemented other than at the server 504.

The key participant detection software 514 identifies key participants during a video conference using a variety of methods. The key participant detection software 514 is configured to receive the real-time transcription and highlight the text of participants that are determined to be key participants. If there are multiple key participants in a video conference, the key participant detection software 514 may highlight the text of the key participants in different colors. The key participant detection software 514 is configured to process the real-time transcription using a machine learning (ML) model trained for contextual awareness. For example, the ML model may detect a key participant by keyword processing that references one or more subjects within some context. The one or more subjects may be based on a plan for the video conference, learned from previous conference plans, or both. In another example, the ML model may detect a phrase spoken by one or more participants suggesting that another participant is a key participant (e.g., "let's defer to Homer on this" or "Lisa would be better able to answer that," and permutations of either). The ML model may detect the key participant based on a determination of keywords within a neighboring word range of that phrase (e.g., within ten words preceding the phrase in the real-time transcription).

The key participant detection software 514 may perform a semantic analysis on the real-time transcription to detect a key participant in examples where two or more participants may be engaged in a discussion without having spoken a keyword or phrase. The semantic analysis may be performed when a duration of time where a keyword or phrase is not detected exceeds a threshold. The semantic analysis may use ML algorithms to determine the key participant, for example, based on previous conferences. In some examples, the key participant detection software 514 may prompt the participants engaged in the discussion to confirm whether the discussion is related to another participant, and whether the other participant is a key participant. The confirmation responses from the participants may be used to learn new key participants for use in performing future semantic analyses.

The key participant detection software 514 may determine that a detected participant in a discussion between two or more participants is not associated with any discussion point of the plan for the video conference. For example, the key participant detection software 514 may compare the detected participant to one or more discussion points of the plan for the video conference to determine whether the detected participant is associated with any of the one or more discussion points. The system may use probabilistic matching to determine a statistical probability that the detected participant is associated any one of the one or more discussion points to determine whether the detected participant is a key participant. The detected participant and associated user data may be stored in a database, such as a user records database 516 of the user system 508, and processed through ML algorithms for future use. If the detected participant is determined to not be associated with at least one of the discussion points, the key participant detection software 514 determines that the detected participant is not a key participant.

The key participant detection software 514 is configured to receive the metadata of the audio signals including one or more participant IDs from the conferencing software 510. In some examples, the participant IDs may be received when a participant joins the video conference, for example, in a join message or another message used to connect to the video conference. Based on one or more participant IDs included in the metadata, the key participant detection software 514 is configured to obtain user data for each participant from the user records database 516 of the user system 508. The user data may include one or more of a name of the participant, a title of the participant, a role of the participant for the video conference (e.g., host, co-host, organizer, or participant), organization chart information indicating relationships between users (e.g., participants) in an organization and the users' positions therein, a length of service of the participant, or a participant score based on prior conference activity of the participant (e.g., cumulative duration of active speaking during recent conferences). The key participant detection software 514 is configured to determine whether a participant is a key participant based on the user data. For example, if the user data indicates that the title of a participant is a manager or higher, the key participant detection software 514 may determine that the participant is a key participant. If the user data indicates that the role of the participant is that of a host, the key participant detection software 514 may determine that the participant is a key participant. In an example where the user data indicates that the length of service of the participant is above a threshold (e.g., 5 years of service), the key participant detection software 514 may determine that the participant is a key participant. In yet another example, if the user data indicates that the participant score of a participant meets a threshold, the key participant detection software 514 may determine that the participant is a key participant. When the key participants of the video conference are determined, the key participant detection software 514 transmits key participant data to the conferencing software 510 indicating the key participants.

The conferencing software 510 receives the key participant data from the key participant detection software 514 and generates a GUI. The conferencing software 510 outputs the GUI for display on participant devices. The GUI may be output to participant devices and key participant devices (e.g., participant devices of key participants) connected to the video conference. The GUI that is generated and output may be an updated version of a GUI that is displayed on the participant devices prior to the identification of one or more key participants and may include one or more of a participant portion and a key participant portion. The participant portion includes one or more participant tiles that each represent a participant of the video conference. The key participant portion includes one or more key participant tiles that each represent a key participant of the video conference. The key participant tiles are larger than the participant tiles.

Figure 6:
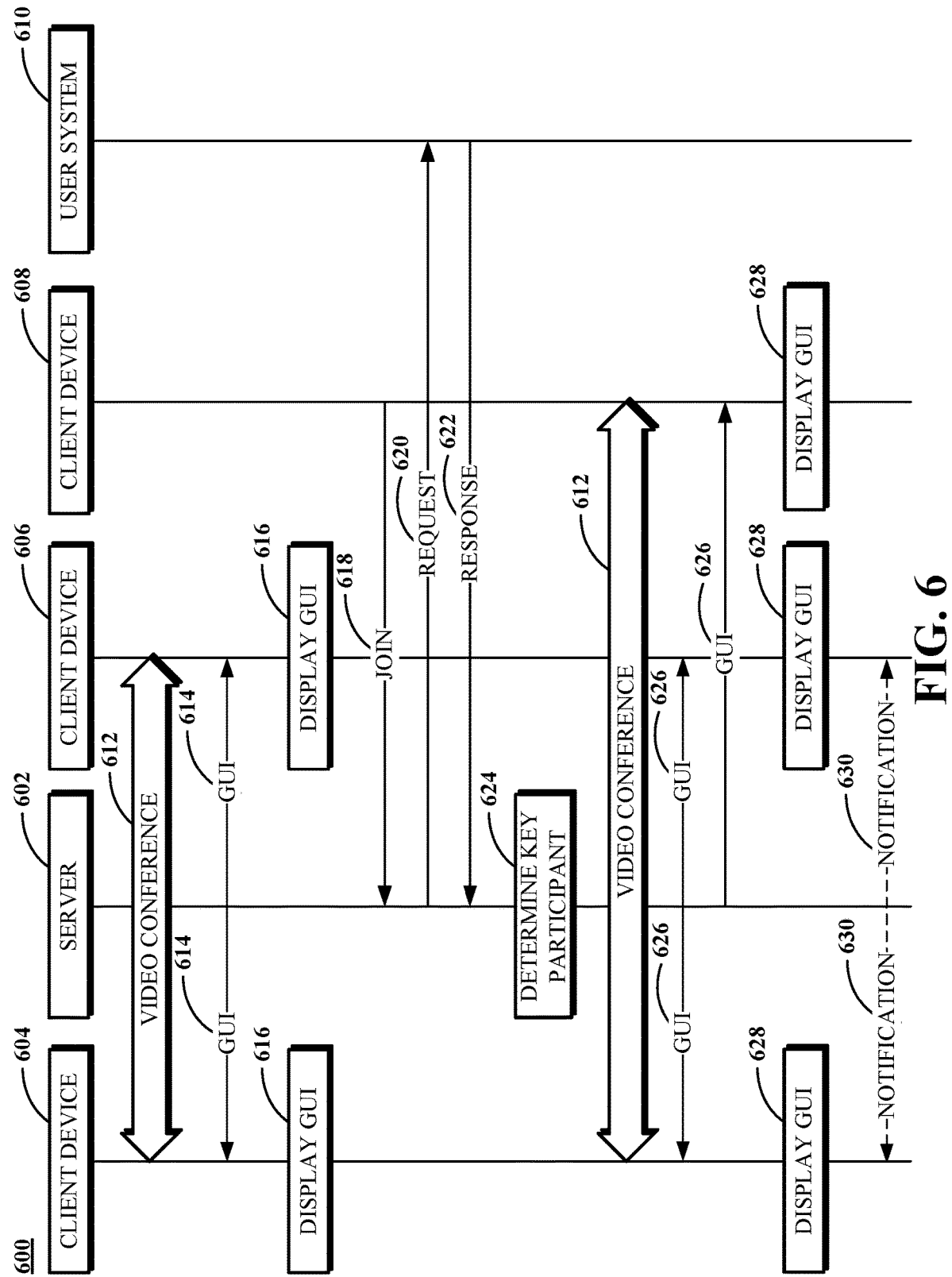
FIG. 6 is a swim lane diagram of an example of a conferencing system for displaying key participants.

FIG. 6 is a swim lane diagram of an example of a conferencing system 600 for displaying key participants. The conferencing system 600 may be the conferencing system 500 shown in FIG. 5. The conferencing system 600 includes a server 600, a client device 604, a client device 606, a client device 608, and a user system 610 which may, for example, respectively be the server 504, first participant device 502, second participant device 506, and user system 508 shown in FIG. 5.

In this example, there is a video conference 612 that is in progress between at least users of the client device 604 and the client device 606. For purposes of this example, the respective users of the client device 604 and the client device 606 are ordinary participants (i.e., not key participants) in the video conference 612. During the video conference 612, the server 602 outputs a GUI 614 to the client device 604 and the client device 606. The client device 604 and the client device 606 each receive the GUI 614 and display 616 the GUI 614 on their respective displays. An example of the GUI 614 is shown in FIG. 7A.

At some point in time during the video conference 612, the server 602 receives a join message 618 from the client device 608. The join message 618 may include a participant ID. Responsive to the join message 618, the server 602 transmits a request 620 for user data to the user system 610. The server 602 includes the participant ID in the request 620. The user system 610 retrieves the user data based on the participant ID and transmits a response 622 that includes the user data to the server 602. The server 602 receives the response 622 and determines 624 that the user of the client device 608 is a key participant based on the user data. When the client device 608 joins the video conference 612 in progress, the server 602 generates a GUI 626, and outputs the GUI 626 to the client device 604, the client device 606, and the client device 608. The client device 604, the client device 606, and the client device 608 each receive the GUI 626 and display 628 the GUI 626 on their respective displays. Examples of the GUI 626 are shown in FIGS. 7B through 7D. In some examples, the server 602 may transmit a notification 630 to the client device 604 and the client device 608 each time a key participant (e.g., the user of client device 608 in this example) joins the video conference 612 and/or speaks during the video conference 612. The notification may be an audible notification, a haptic notification, another alert, or any combination thereof, sent to participants' devices when a key participant joins the video conference 612 and/or speaks during the video conference 612.

Figure 7A:
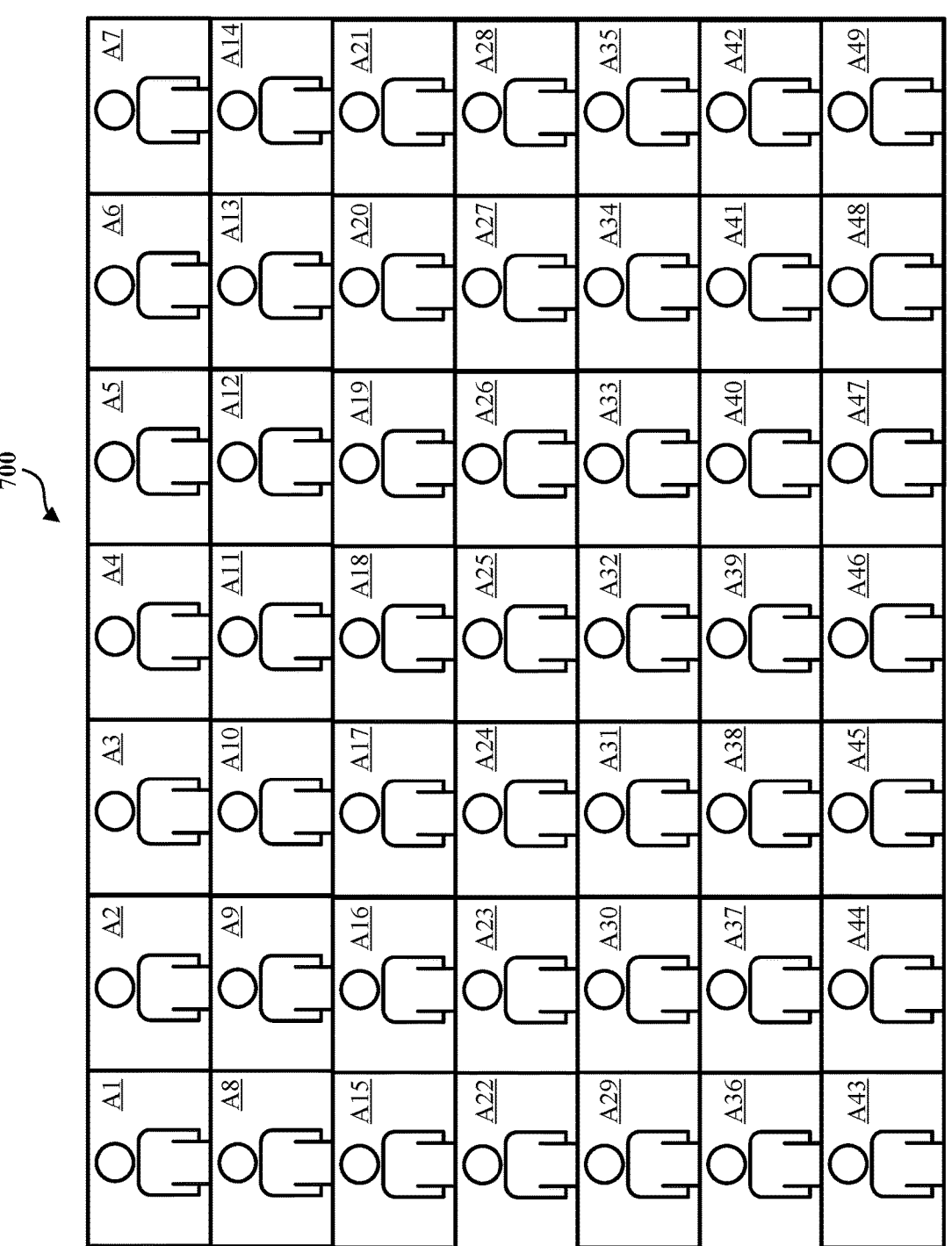
FIGS. 7A-7D are diagrams of example graphical user interfaces (GUIs) for displaying participants in a video conference.
Figure 7B:
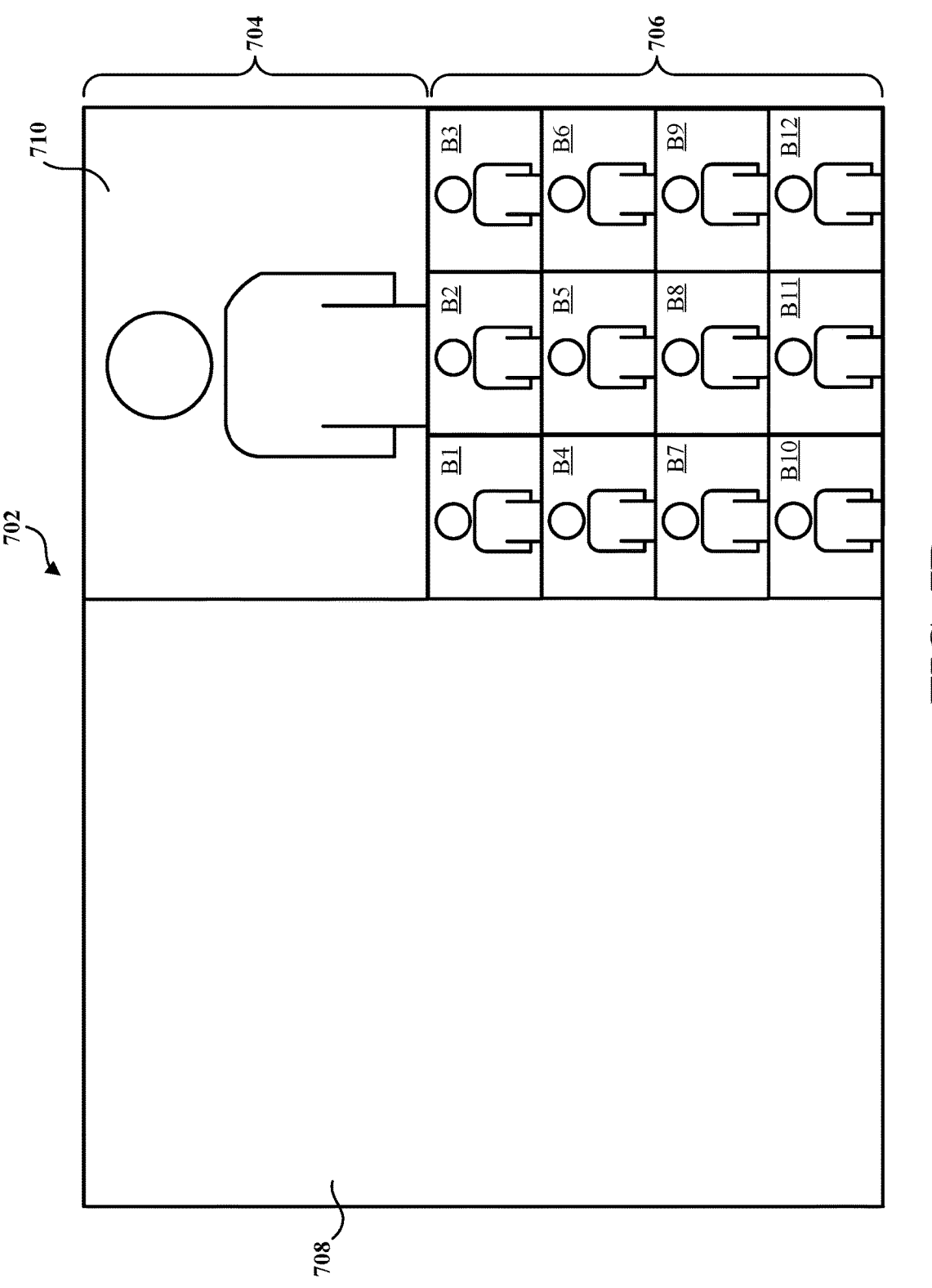
Figure 7C:
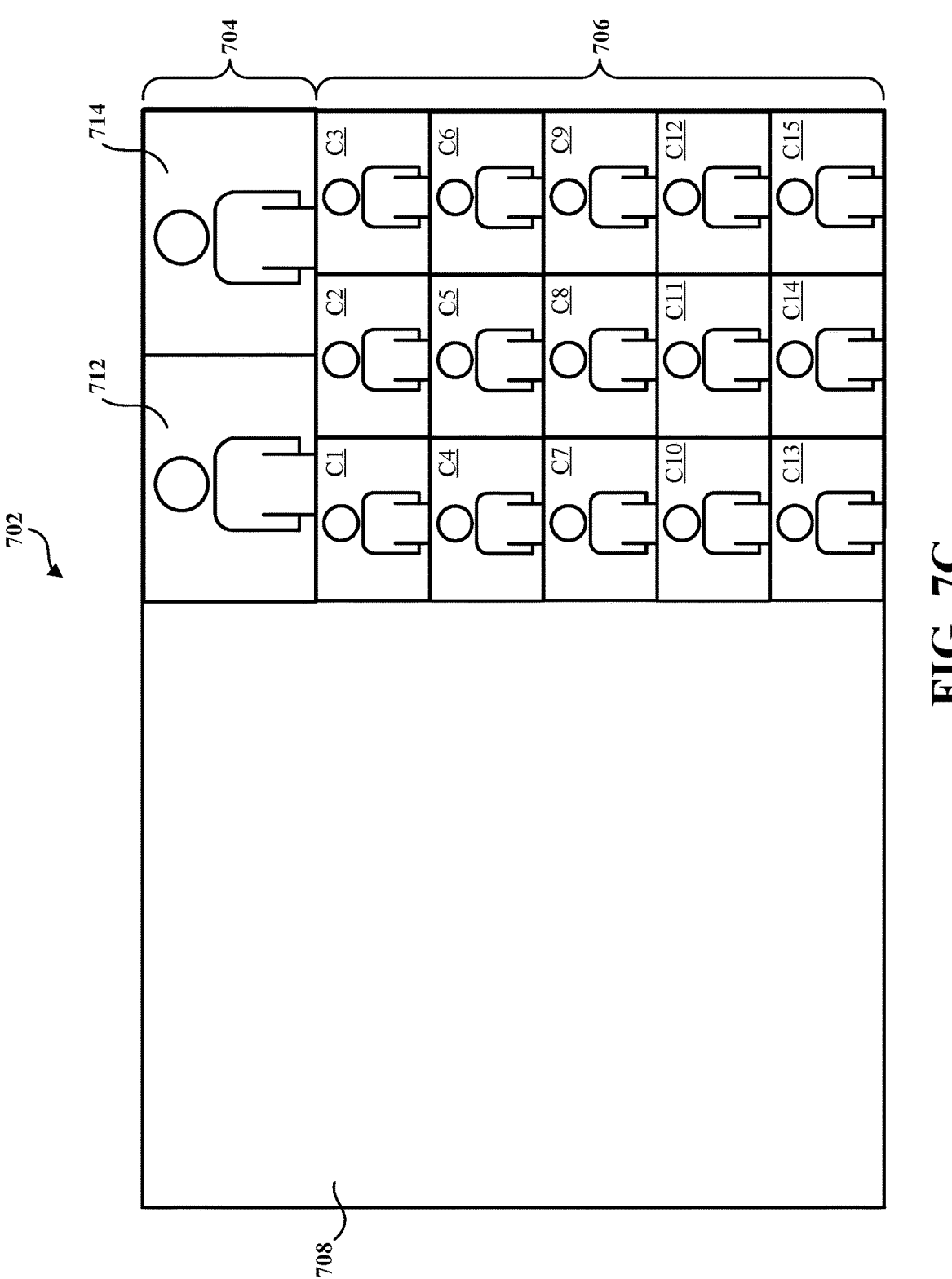
Figure 7D:
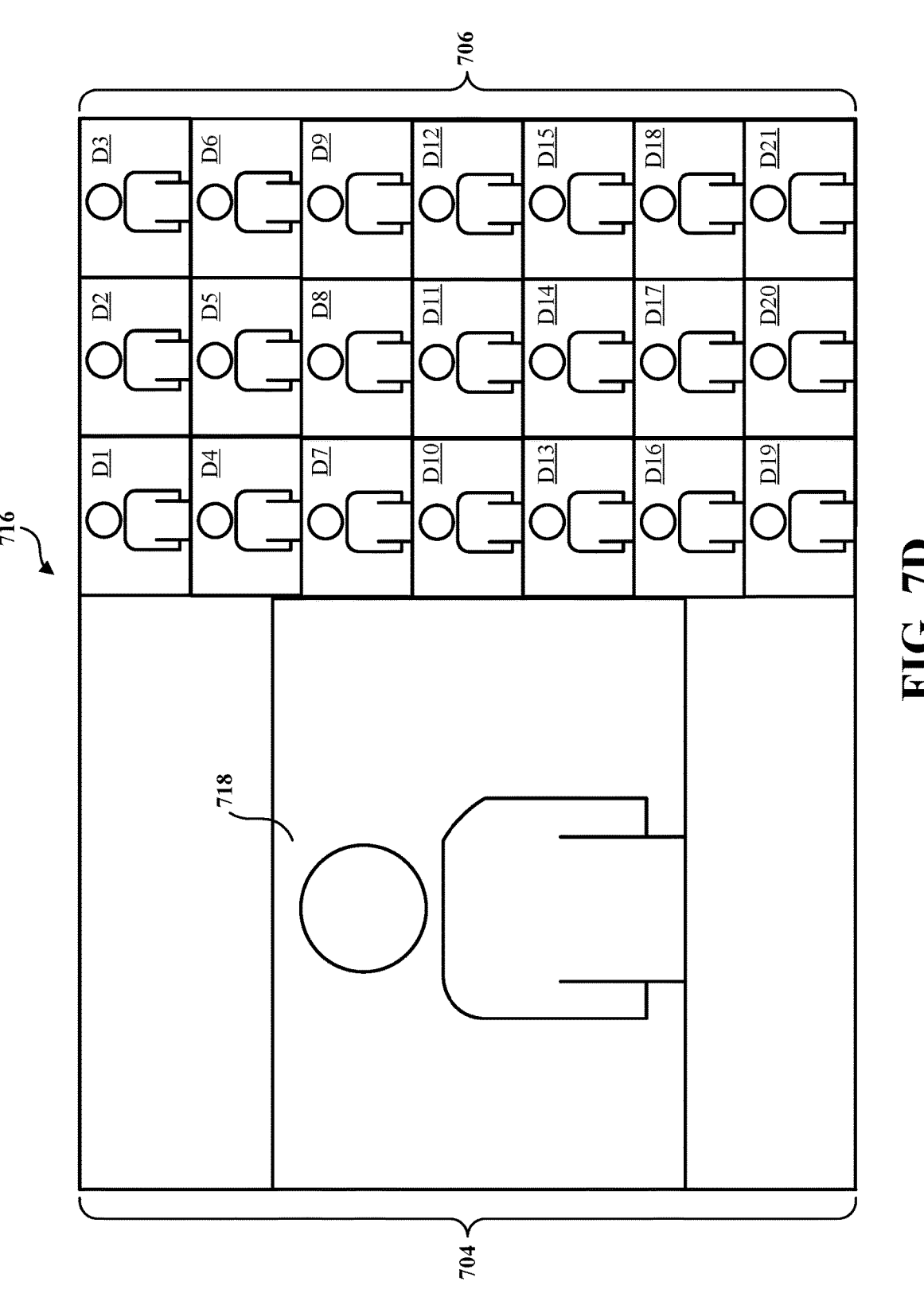

FIGS. 7A-7D are diagrams of example GUIs for displaying participants in a video conference. FIG. 7A is a diagram of an example of a GUI 700 displayed in a video conference where a key participant is not yet present. The GUI 700 is an example of the GUI 614 shown in FIG. 6. As shown in FIG. 7A, the GUI 700 includes 49 individual participant tiles A1-A49, each participant tile A1-A49 representing a different participant of the video conference. 49 participant tiles are shown as an example, and more participant tiles or less participant tiles may be displayed based on the number of participants attending the video conference. In this example, since there are no key participants present in the video conference, each participant tile A1-A49 is displayed having the same size. As more participants join the video conference, the size of each participant tile may in some cases decrease equally to accommodate the new participant tiles. As participants exit the video conference, the size of each remaining participant tile may in some cases increase equally to accommodate the space left by the tiles of the participants that exited the video conference.

FIG. 7B is a diagram of an example of a GUI 702 displayed in a video conference where a key participant is present. The GUI 702 is an example of the GUI 626 shown in FIG. 6. As shown in FIG. 7B, the GUI 702 includes a key participant portion 704, a participant portion 706, and a screen share portion 708. The key participant portion 704, the participant portion 706, and the screen share portion 708 may be arranged in any manner in the GUI 702 and not limited to the arrangement shown in FIG. 7B. The screen share portion 708 is configured to display a presenter's screen to the conference participants. The presenter may be any conference participant and the screen sharing capability is not limited to the key participant. In some examples, the screen share portion 708 may include or be replaced by a whiteboard portion and/or a chat portion. In this example, the key participant portion 704 includes a key participant tile 710, and the participant portion 706 includes 12 individual participant tiles B1-B12 where each participant tile B1-B12 represents a different participant of the video conference. The system enlarges the key participant tile 710 such that it is distinguishable from the participant tiles B1-B12 and is easily viewable by conference participants. The key participant tile 710 may be a persistent tile such that it remains in the key participant portion 704 regardless of whether the key participant is sharing a screen or presenting. The sizing of the participant tiles B1-B12 as more participants join the video conference and when participants exit the video conference is the same as described above with respect to FIG. 7A.

FIG. 7C is a diagram of an example of the GUI 702 shown in FIG. 7B that is modified to include multiple key participant tiles. In this example, the key participant portion 704 includes a key participant tile 712 and a key participant tile 714, and the participant portion 706 includes 15 individual participant tiles C1-C15 where each participant tile C1-C15 represents a different participant of the video conference. In this example, two key participant tiles are shown, however, more than two key participant tiles may be displayed in some scenarios. The system enlarges the key participant tile 712 and the key participant tile 714 such that they are distinguishable from the participant tiles C1-C15 and is easily viewable by conference participants. The key participant tile 712 and the key participant tile 714 may be persistent tiles such that they remain in the key participant portion 704 regardless of whether one or more of the key participants is sharing a screen or presenting. In some examples, the system may reduce the size of the participant portion 706 and the screen share portion 708 to increase the size of the key participant portion 704, for example when there are more than two key participants.

FIG. 7D is a diagram of an example of a GUI 716 for a video conference that does not have a current screen share or presentation. The GUI 716 is another example of the GUI 626 shown in FIG. 6. In this example, the key participant portion 704 includes a key participant tile 718 and the participant portion 706 includes 21 individual participant tiles D1-C21 where each participant tile D1-D21 represents a different participant of the video conference. In this example, one key participant tile is shown, however, more than one key participant tile may be displayed in some scenarios. The system enlarges the key participant tile 718 such that it is distinguishable from the participant tiles D1-D21 and is easily viewable by conference participants. The key participant tile 718 may be a persistent tiles such it remains in the key participant portion 704 regardless of whether one or more of the key participants is sharing a screen or presenting.

Figure 8:
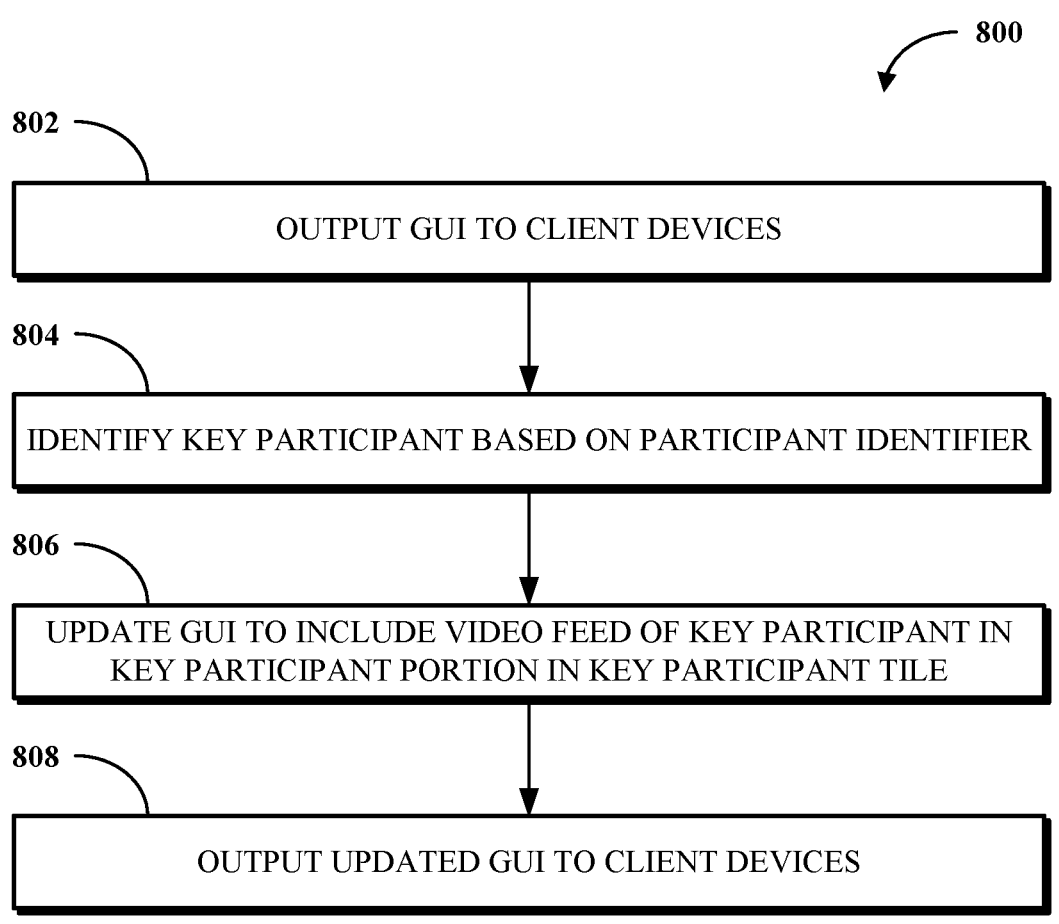
FIG. 8 is a flowchart of an example of a method for displaying key participants in a video conference.

To further describe some implementations in greater detail, reference is next made to examples of techniques which may be performed by or using a system for generating and outputting a GUI for displaying key participants in a video conference. FIG. 8 is a flowchart of an example of a technique 800 for displaying key participants in a conference. The technique 800 can be executed using computing devices, such as the systems, hardware, and software described with respect to FIGS. 1-7D. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, the technique 800 includes outputting a GUI to client devices for a video conference. The GUI may be configured to include a participant portion, a key participant portion, a screen share portion, or any combination thereof. The participant portion includes one or more participant tiles that each represent a different participant of the conference. The key participant portion includes one or more key participant tiles that each represent a different key participant. The key participant tiles are larger than the participant tiles such that they are easily viewable by conference participants.

At 804, the technique 800 includes identifying a key participant. The key participant may be identified based on a participant ID. The participant ID may be included in a join message to join the video conference or obtained from user data obtained from a user system. The participant ID may include one or more of a participant title within an organization, a participant role for the video conference, organization chart information indicating relationships between users (e.g., participants) in an organization and the users' positions therein, a participant length of service, or a participant conference activity score. In an example, if the participant ID indicates that the title of a participant is a manager or higher, the system may determine that the participant is a key participant. If the participant ID indicates that the role of the participant is that of an organizer of the video conference, the system may determine that the participant is a key participant. In an example where the participant ID indicates that the length of service of the participant is above a threshold (e.g., 5 years of service), the system may determine that the participant is a key participant. In yet another example, if the participant ID indicates that the participant score of a participant meets a threshold, the system may determine that the participant is a key participant.

At 806, the technique 800 includes updating the GUI to include a video feed of the key participant in the key participant portion in a key participant tile. Updating the GUI includes enlarging the key participant tile such that it is distinguishable from the participant tiles and is easily viewable by conference participants. The key participant tile may be a persistent tile such that it remains in the key participant portion regardless of whether the key participant is sharing a screen or presenting. As more participants join the video conference, the GUI may be updated such that the size of each participant tile may in some cases decrease equally to accommodate the new participant tiles. As participants exit the video conference, the GUI may be updated such that the size of each remaining participant tile may in some cases increase equally to accommodate the space left by the tiles of the participants that exited the video conference. At 808, the technique 800 includes outputting the updated GUI to the client devices of the video conference. The GUI may be output to participant devices and key participant devices (e.g., participant devices of key participants) connected to the video conference. The participant devices and the key participant devices receive the updated GUI and display the updated GUI on their respective displays.

In some examples, the technique 800 may include transcribing an audio feed of the video conference and highlighting the text of the audio feed associated with a key participant based on the key participant being identified as a key participant. If more than one key participant is identified, the text of each identified key participant may be highlighted in the transcript of the conference in different colors based on each of the key participants being identified as key participants.

An aspect includes a method that may include outputting, for a video conference, a GUI configured to include one or more of a participant portion that includes participant tiles and a key participant portion that includes key participant tiles, wherein the key participant tiles are larger than the participant tiles. The method may include identifying a key participant based on one or more participant identifiers. The method may include updating the GUI to include a video feed of the key participant in the key participant portion in a key participant tile.

An aspect includes a system that comprises a processor. The processor may be configured to output, for a video conference, a GUI configured to include one or more of a participant portion that includes participant tiles and a key participant portion that includes key participant tiles, wherein the key participant tiles are larger than the participant tiles. The processor may be configured to identify a key participant based on one or more participant identifiers. The processor may be configured to update the GUI to include a video feed of the key participant in the key participant portion in a key participant tile.

An aspect includes a non-transitory computer-readable medium comprising instructions that when executed by a processor, cause the processor to perform operations. The operations may include outputting, for a video conference, a GUI configured to include one or more of a participant portion that includes participant tiles and a key participant portion that includes key participant tiles, wherein the key participant tiles are larger than the participant tiles. The operations may include identifying a key participant based on one or more participant identifiers. The operations may include updating the GUI to include a video feed of the key participant in the key participant portion in a key participant tile.

In one or more aspects, the one or more participant identifiers may include a participant title. In one or more aspects, an audio feed of the video conference may be transcribed. In one or more aspects, text associated with the audio feed of the key participant may be highlighted based on identification of the key participant. In one or more aspects, a second key participant may be identified in the video conference. In one or more aspects, the text of the audio feed associated with the key participant may be highlighted in a first color based on the key participant being identified as a key participant. In one or more aspects, the text of the audio feed associated with the second key participant may be highlighted in a second color based on the second key participant being identified as a second key participant. In one or more aspects, an audible notification may be transmitted when a key participant joins the video conference. In one or more aspects, a haptic notification may be transmitted to participant devices when a key participant joins the video conference. In one or more aspects, a haptic notification may be transmitted to participant devices when a key participant begins speaking. In one or more aspects, the one or more participant identifiers may include a participant role for the video conference. In one or more aspects, a haptic notification and an audible notification may be transmitted when a key participant begins speaking. In one or more aspects, the one or more participant identifiers may include a participant conference activity score.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
outputting, for a video conference, a user interface configured to include one or more of a participant portion that includes participant tiles and a key participant portion that includes key participant tiles, wherein the key participant tiles are larger than the participant tiles;
identifying a key participant based on one or more participant identifiers;
transcribing an audio feed of the video conference;
identifying a second key participant in the video conference;
highlighting transcribed text associated with the audio feed of the key participant in a first color;
highlighting the transcribed text associated with the audio feed of the second key participant in a second color; and
updating the user interface to include a video feed of the key participant in the key participant portion in a key participant tile.

2. The method of claim 1, wherein the one or more participant identifiers include a participant title.

3. The method of claim 1, wherein identifying the key participant comprises:
determining that the participant has a participant conference activity score above a threshold, wherein the participant conference activity score is based on a cumulative duration of active speaking during recent conferences.

4. The method of claim 1, further comprising:
transmitting a notification to participant devices when the key participant begins sharing a screen during the video conference.

5. The method of claim 1, further comprising:
transmitting an audible notification when the key participant joins the video conference.

6. The method of claim 1, further comprising:
transmitting a haptic notification to participant devices when the key participant joins the video conference.

7. The method of claim 1, further comprising:
transmitting a haptic notification to participant devices when the key participant begins speaking.

8. A system, comprising:
a processor configured to:
output, for a video conference, a user interface configured to include one or more of a participant portion that includes participant tiles and a key participant portion that includes key participant tiles, wherein the key participant tiles are larger than the participant tiles;
identify a key participant based on one or more participant identifiers;
transcribing an audio feed of the video conference;
identify a second key participant in the video conference;
highlight transcribed text associated with the audio feed of the key participant in a first color;
highlight the transcribed text associated with the audio feed of the second key participant in a second color; and
update the user interface to include a video feed of the key participant in the key participant portion in a key participant tile.

9. The system of claim 8, wherein the one or more participant identifiers include a participant role for the video conference.

10. The system of claim 8, wherein the processor is further configured to:

determine that the participant has a participant conference activity score above a threshold, wherein the participant conference activity score is based on a cumulative duration of active speaking during recent conferences.

11. The system of claim 8, wherein the processor is further configured to:

transmit a notification to participant devices when the key participant begins sharing a screen during the video conference.

12. The system of claim 8, wherein the processor is further configured to:

transmit an audible notification when the key participant joins the video conference.

13. The system of claim 8, wherein the processor if further configured to:

transmit a haptic notification and an audible notification when the key participant joins the video conference.

14. The system of claim 8, wherein the processor is further configured to:

transmit a haptic notification and an audible notification when the key participant begins speaking.

15. A non-transitory computer-readable medium comprising instructions that when executed by a processor, cause the processor to perform operations comprising:

outputting, for a video conference, a user interface configured to include one or more of a participant portion that includes participant tiles and a key participant portion that includes key participant tiles, wherein the key participant tiles are larger than the participant tiles;

identifying a key participant based on one or more participant identifiers;

transcribing an audio feed of the video conference;

identifying a second key participant in the video conference;

highlighting transcribed text associated with the audio feed of the key participant in a first color;

highlighting the transcribed text associated with the audio feed of the second key participant in a second color; and updating the user interface to include a video feed of the key participant in the key participant portion in a key participant tile.

16. The non-transitory computer-readable medium of claim 15, wherein the one or more participant identifiers include a participant conference activity score.

17. The non-transitory computer-readable medium of claim 15, wherein identifying the key participant comprises:

determining that the participant has a participant conference activity score above a threshold, wherein the participant conference activity score is based on a cumulative duration of active speaking during recent conferences.

18. The non-transitory computer-readable medium of claim 15, wherein the operations further comprise:

transmitting a notification to participant devices when the key participant begins sharing a screen during the video conference.

19. The non-transitory computer-readable medium of claim 15, wherein the operations further comprise:

transmitting an audible notification to participant devices when the key participant joins the video conference.

20. The non-transitory computer-readable medium of claim 15, wherein the operations further comprise:

transmitting a haptic notification to participant devices when the key participant joins the video conference.

* * * * *